(12) United States Patent
Angenendt

(10) Patent No.: US 7,795,328 B2
(45) Date of Patent: Sep. 14, 2010

(54) INORGANIC FIRE-RESISTANT AND THERMALLY INSULATING PASTE, USE THEREOF, AND SHAPED PARTS MADE THEREFROM

(75) Inventor: Rainer Angenendt, Xanten (DE)

(73) Assignee: MV Engineering GmbH & Co. KG., Krefeld (DE)

( * ) Notice: Subject to any disclaimer, the term of this patent is extended or adjusted under 35 U.S.C. 154(b) by 1118 days.

(21) Appl. No.: 10/584,439

(22) PCT Filed: Dec. 16, 2004

(86) PCT No.: PCT/EP2004/014312

§ 371 (c)(1),
(2), (4) Date: Jun. 22, 2006

(87) PCT Pub. No.: WO2005/063649

PCT Pub. Date: Jul. 14, 2005

(65) Prior Publication Data

US 2007/0154696 A1 Jul. 5, 2007

(30) Foreign Application Priority Data

Dec. 23, 2003 (DE) ................. 103 60 749

(51) Int. Cl.
*C09K 21/14* (2006.01)
*C09D 5/18* (2006.01)
(52) U.S. Cl. ............ 523/179; 106/15.05; 106/18.12
(58) Field of Classification Search ............ 523/179
See application file for complete search history.

(56) References Cited

U.S. PATENT DOCUMENTS

| 3,317,455 | A | * | 5/1967 | Blome et al. .......... 523/219 |
| 3,639,260 | A | * | 2/1972 | Michalski ............. 516/117 |
| 4,005,033 | A | * | 1/1977 | Georgeau et al. ......... 521/59 |
| 4,018,983 | A | * | 4/1977 | Pedlow ................ 174/135 |
| 4,031,059 | A | | 6/1977 | Strauss ................ 260/37 |
| 4,112,179 | A | * | 9/1978 | Maccalous et al. ....... 428/325 |
| 4,278,468 | A | * | 7/1981 | Selbe et al. ............ 106/774 |
| 4,286,013 | A | * | 8/1981 | Daroga et al. ........... 442/136 |
| 4,320,163 | A | * | 3/1982 | Schwartz .............. 428/158 |
| 4,568,718 | A | * | 2/1986 | Huebner et al. ......... 524/837 |
| 4,719,251 | A | * | 1/1988 | Dietlein et al. ......... 523/218 |
| 4,837,250 | A | * | 6/1989 | Headrick et al. ........ 523/179 |
| 4,879,066 | A | * | 11/1989 | Crompton ............. 252/606 |
| 5,064,868 | A | * | 11/1991 | Simpson et al. ......... 521/54 |
| 5,262,454 | A | * | 11/1993 | Leroux et al. .......... 523/219 |
| 5,523,059 | A | * | 6/1996 | Langer ................. 422/179 |
| 5,661,198 | A | * | 8/1997 | Inatani et al. .......... 523/179 |
| 5,672,389 | A | * | 9/1997 | Tran et al. ............. 427/294 |
| 5,905,101 | A | * | 5/1999 | Fujiki et al. ........... 523/138 |
| 6,153,668 | A | * | 11/2000 | Gestner et al. ......... 523/179 |
| 6,153,674 | A | * | 11/2000 | Landin ................. 524/35 |
| 6,214,450 | B1 | * | 4/2001 | Wickert et al. ......... 428/220 |
| 6,231,650 | B1 | * | 5/2001 | Mallow et al. ......... 106/15.05 |
| 6,395,855 | B1 | | 5/2002 | Luft et al. ............. 528/14 |
| 6,627,697 | B2 | * | 9/2003 | Barney et al. .......... 524/588 |
| 6,858,550 | B2 | * | 2/2005 | Ahluwalia ............. 442/136 |
| 2003/0228460 | A1 | * | 12/2003 | Ahluwalia ............. 428/315.5 |
| 2004/0192788 | A1 | * | 9/2004 | Smith et al. ............ 516/53 |

FOREIGN PATENT DOCUMENTS

| DE | 4340339 | 6/1995 |
| DE | 19533564 | 3/1997 |
| DE | 19735648 | 2/1999 |
| DE | 29817995 | 3/1999 |

* cited by examiner

*Primary Examiner*—Randy Gulakowski
*Assistant Examiner*—Robert Loewe
(74) *Attorney, Agent, or Firm*—Jonathan Myers; Andrew Wilford

(57) ABSTRACT

Disclosed is a randomly moldable thermosetting paste containing small mineral balls, an inorganic binder or a mixture of such binders, and a fiber moiety. Said paste is characterized in that hollow mineral microballs are used. The paste which cures starting at room temperature is suitable for use as a fire-resistant and heat-insulating material that is provided with great inherent stability in the cured state. The inventive paste is suitable for the production of inexpensive low-density molded parts. Moreover, the invention makes it possible to dispense with the use of organic solvents such that the paste can be used directly by the user.

13 Claims, No Drawings though the molded parts are unbreakable. Moreover, the described method is not suitable for the production of fire-resistant molded parts because the melamine formal-dehyde resin burns, releasing toxic substances. Silicate adhesives are unsuited because of their alkalinity.

INORGANIC FIRE-RESISTANT AND THERMALLY INSULATING PASTE, USE THEREOF, AND SHAPED PARTS MADE THEREFROM

CROSS REFERENCE TO RELATED APPLICATIONS

This application is the U.S. national phase of PCT application PCT/EP2004/014312, filed 16 Dec. 2004, published 14 Jul. 2005 as WO 2005/063649, and claiming the priority of German patent application 10360749.8 itself filed 23 Dec. 2003.

The invention relates to a freely shapeable, curable paste containing small mineral spheres, an inorganic binder or a mixture of such binders and fibers.

The invention relates to the field of fire protection and thermal insulation in the high temperature range. To date, either organic foams, such as polyurethanes or polystyrenes or inorganic mineral fiber materials, pressed pyrogenic silicic acid or foamed glasses, were used for thermal insulation. Organic insulating materials have the disadvantage that they are flammable, even if fire inhibiting substances are added, and can char and burn. Mineral wool and inorganic fiber materials have the disadvantage that the binders used decompose at a temperature of more than 200° and that fiber material is thus released. Thus, both the heat-insulating characteristics and the fire-protection characteristics are impaired.

STATE-OF-THE-ART

Known heat-insulating materials in the form of boards need to have a protective layer, for example made of gypsum plaster or steel, in order to maintain mechanical stability under elevated temperatures. Without the protective layer, the insulation board would collapse under the threshold temperature.

Furthermore, fire-protection boards, for example made of calcium and silicate are known that are less suitable for thermal insulation, however, and disadvantageously have a very high density.

In the foundry field for steel casting and the casting of nonferrous metals, supply tundishes (feeders) are formed that are lined with a moldable mass. If the insulation effect of the feeders is insufficient, exothermal feeder materials are used. This mass burns on contact with the molten casting metal and thereby conveys heat to the metal that is being fed in. This effect is used to keep certain parts of the molten casting mass for a longer time than others. The supply funnels nowadays are called feeders, since they "feed" the casting after the form was filled, i.e. they let metal flow back into the casting. The flow results from the shrinking of the molten metal in the casting mold during cooling. The lining of the feeders nowadays is formed prefabricated inserts.

When the core sand that forms the casting mold is removed after the casting operation and solidification of the casting, the feeder sleeve (short term: feeder) that was surrounded by the core sand before, is exposed to air. If this feeder/feeder sleeve contains organic components, e.g. organic binders, the hot feeder starts to burn, and toxic or at least highly unpleasant gases and vapors are released. Cheap, thermally and mechanically stable feeder sleeves/feeders that release only a small amount of these gases and vapors or no gases and vapors at all, are not known in the state of the art.

In DE 197 35 648 A1 a method for producing an inorganic insulation material is described that, if possible, should cure at room temperature and should be produced using aerogels, with basically no organic solvents used and that is barely flammable. Thus that document proposes mixing oxidic aerogels with a watery polysiloxane emulsion, so that the surface of the oxidic aerogels is preferably completely wetted with the watery polysiloxane emulsion and the compact compound is subsequently cured.

This thermally insulating material in its cured form, for example in form of insulation board, needs to be covered with a protective layer for maintaining the mechanical stability. Such a board cannot be used if it is not provided with such a protective layer.

The material is cured by evaporation of the water contained in the mixture at room temperature and without pressure.

For the production of a board made of this mixture according to example 1 with a thickness of 2 cm the mixture has to cure for 5 days at room temperature.

According to example 2 in that document, the mixture is applied in a mold 3 cm thick around a pipe to be insulated. Additionally, a plastic foil is applied around the layer. The layer cures in air at room temperature within 8 days. Only afterward is the layer compacted to serve as insulation material.

These curing times of five or eight days for an insulation material are too long for the substance to be used in practice. Additionally, the enveloping plastic foil of example 2, in practice would prevent evaporation of the water. Therefore, the eight days necessary for curing are a merely theoretical interpolation of the description in example 1. If a 2 cm thick board needs five days for curing, theoretically, it would take about eight days for a 3 cm thick layer to cure. But the 3 cm thick layer according to example 2 cannot dry and therefore cannot cure at all, due to the applied plastic foil.

Because of the excessively long drying and curing times, this method or this mixture is not suitable for the production of an inorganic insulation material in practice, since there the curing time should not exceed the limit of one day.

Furthermore, the known mixture of aerogels and a polysiloxane emulsion is not a freely shapeable, paste-like mass with inherent stability, but a fluid product that has to be covered during the curing procedure.

DE 195 33 564 A1 corresponds to the preamble of claim 1 and describes a fibrous aerogel composite material. Aerogels have a very low density due to a high microscopic porosity and therefore are also used as thermally insulating materials. The high porosity leads to a low mechanical stability of the aerogels. Due to the multiplicity of microscopic pores, aerogels are very hygroscopic and are also used for drying gases and particularly for drying air.

That document teaches that even small volumetric content of fibers result in a substantial mechanical reinforcement of a composite material of aerogel particles and a binder compared to a material that consists only of aerogel particles.

The disadvantage of the excessively long drying and curing time in the method of DE 197 35 648 A1 is avoided there, thanks to pressing under elevated temperatures. Thus, according to example 1, a molded element consisting of a stable board is produced out of a mixture of aerogels, melamine formaldehyde resin powder and microcellulose by means of pressing for 9 minutes at a temperature of 160° C. and a pressure of 20 bar. If the molded element is produced according to example 2, it is pressed for 10 minutes at a temperature of 160° C. and a pressure of 10 to 20 bar. Instead of an organic binder, inorganic binders as e.g. silicate adhesives can be used as well. Silicate adhesives, however, often do not qualify as adequate binders due to their high alkalinity and brittleness.

Silicate adhesives contain only a small amount of water (2-10%). These procedures cannot be applied in an economic way as far as watery binder systems with a higher water percentage are concerned, since the drying would take too long. Since the water has to evaporate during drying, heated pressing is not an appropriate drying method.

On the one hand, regarding this known procedure and the molded elements produced therein, it is disadvantageous, in addition to the high costs for the aerogels, that the shaping has to be carried out at elevated temperatures and under elevated pressure. On the other hand the known composite materials are more or less hygroscopic due to their macroscopic and microscopic porosity, so that they qualify as adequate adsorption materials for fluids, vapors and gasses. These molded elements, however, do not qualify as a fire-protection material to be used as well at elevated temperatures above 800° C., since they release toxic vapors (melamine formaldehyde) and are flammable.

When applied e.g. in foundry technologies, where the insulation materials can be heated to temperatures of 800° C. to 1500° C. in fractions of seconds by a molten metal, low amounts of water or humidity explosively escape and destroy the mold. This can lead to severe accidents. Therefore, in foundry work materials are used for insulation that cannot adsorb water. Not only is the use of aerogels risky, but the silicate adhesive mentioned before as well is not used for the same reasons.

In the document, requirements regarding the fire protection and the fire class of the composite material are mentioned, but the composite material itself is not a fire-protection material designed to resist very high temperatures for a very long time. The composite material should instead not be fire-promoting and thus should preferably contain nonflammable types of fibers and barely flammable binders, although the latter can still be combustible.

A free shapeability, thus moldability of the not yet cured mixture is not described in that document.

From DE 298 17 995 U1 a coated glass fiber felt and its production are known. A glass fiber felt for an acoustic ceiling board is painted with a fire retardant, not a fire promoting so-called "paste" that contains hollow or massive microspheres made of glass-like substances.

This "paste" is not a freely shapeable mass for an independent massive shaped part, but a paint material for the glass fiber felt. It is known that microspheres are mixed in, in order to improve flowability, thus in order to achieve a reduction of the viscosity in dispersion colors and lacquers, in paint materials. This is in contrast to the requirements for a freely shapeable paste, that should however have an improved inherent stability and not an improved flowability, that is reduced stability.

According to the technical teaching of that document, spots and finish differences in the appearance should be avoided. The fiber orientation should be invisible, too. A bendable, coated and porous glass fiber felt should be produced that can be rolled up without causing any damage to the coating. The appearance of the coated glass fiber felt is of particular importance. This requirement is fulfilled by the filling particles in the paint material that fill irregularities in the glass fiber felt and form an even layer on the product surface. The formation of an even layer, where irregularities are filled, is a characteristic for viscous paint materials and lacquers that slightly flow after their application and therefore form a smooth surface. This is obviously meant by the descriptions in this document. Indeed, not all irregularities and pores are filled with the paint material since the desired porosity according to the requirements regarding an acoustic felt would not be maintained. Thus, it is made clear that the "paste" disclosed in that document is a viscous, but at least a fluid, paint material and not a freely shapeable paste for the production of shaped parts.

Thus, that document does not concern the production of shaped parts made of a paste, but paint materials. Moreover, it is disadvantageous that the glass-fiber felt coated with the pasty paint material has to be dried at an elevated temperature, e.g. at 120° C. to 180° C.

Furthermore, there cannot be found any hint in that document that would indicate that the end product is not hygroscopic, as required according to the invention. Because of the porosity of the coated glass fiber felt it can even be assumed that this end product is hygroscopic.

OBJECT OF THE INVENTION

Compared to the state of the art, it is the object of the invention to develop a freely shapeable, curable paste according to the preamble of claim 1 that can cure relatively quickly at room temperature and without the application of elevated pressure in order to form a non-hygroscopic end product. Depending on the requirements, binders should be used that cure at room temperature or elevated temperature or only at elevated temperature. The paste should be applied directly on site and subsequently cure and dry at room temperature. The drying of the paste at room temperature directly on site implies that this is carried out at room temperature without elevated pressure being applied as the necessary pressurizing devices are not always present on site. The fact that the end product cannot adsorb a significant amount of humidity is important for the use e.g. in the foundry industry.

It is furthermore the object of the invention to provide a paste for the use as fire-protection and thermally insulating material curing already at room temperature that has such a high inherent stability when cured that there is no need to apply a protective layer that is necessary for insulation boards according to the state of the art. In addition, the use of organic solvents is to be avoided in order to allow a direct use of the paste by the applicant. The paste should be adequate for the production of cost-efficient shaped parts with a very low density.

This object is solved according to the invention by a freely shapeable, curable paste containing small mineral spheres, an inorganic binder or a mixture of such binders and fibers, characterized in that mineral hollow microspheres are used.

The stability of the paste is achieved by fibers. The fiber reinforcement of the paste according to the invention, or respectively of the shaped part produced of the paste according to the invention is surprisingly high so that no additional measure for achieving mechanical stability, such as the known protective layer is required.

According to the invention the following advantages are achieved:

1. High green bond, thus a high stability of the molded element before the curing.

2. Low green density, wherein green densities of the cured material of 100 g/l were achieved.

3. High thermal-insulation characteristic.

4. Even if heated to a temperature of 800° C. and even up to 1600° C., the molded element is practically odorless, thus has only minimal emissions.

5. Thin, complicated shapes can be milled into the cured shaped part, without causing any damage to the shaped part; thus, unproblematic post processing of the shaped part is possible.

6. The shaped part is not hygroscopic and can therefore be used at very high temperatures, that is at 1400° C. and more, without any risk of an explosive evaporation of the water contained therein.

7. The shaped part has a high mechanical temperature stability. It is very stable due to the combination of different materials with different softening points or respectively melting points, even at high temperatures. For example, thanks to a purposeful selection of the hollow microspheres with different melting ranges in the same molded element, crack formation or respectively tension fissures can be avoided.

8. The costs for the shaped part are significantly lower compared to shaped parts with a content of aerogel particles.

As far as the choice of the hollow microspheres is concerned, there are a lot of possibilities to select them according to the purpose of use and according to the characteristics of the shaped part in respect of the grain size and the origin of the hollow microspheres that are for example made of fly ash or synthetically produced. Thus, the prices, the weight and the processability of the shaped part are very variable.

The characteristic of the end product according to the invention, on the one hand not to adsorb an important amount of humidity and simultaneously to be freely shapeable and on the other hand to cure at room temperature or according to the requirements at elevated or exclusively at elevated temperature under normal pressure in surprising manner in such a short period of time, is of significant advantage, since thus the method becomes practice adequate. Additionally, the costs of the hollow microspheres used according to the invention are advantageous compared to the relatively expensive aerogel particles. Moreover, a cost-efficient paste for the quick production of corresponding molded elements with an inherent stability and effective even at very high temperatures was long since required. Although the hollow microspheres used since at least 1997, the priority year of DE 298 17 995 U1, are known, a corresponding paste for fire production or a corresponding molded element produced thereof have not become known so far.

According to the invention, independent massive shaped parts and a paste adequate for their production were developed, and the shaped parts both in cured condition as well as directly after the shaping, that is as green bodies, have an inherent stability and do not need to be provided with an additional protective layer, such as e.g. a glass-fiber felt according to DE 298 17 995 U1 that is painted with the paste. The high flexibility praised there is not necessary according to the invention, since this characteristic is not required for the produced molded element.

Preferably the paste according to the invention contains hollow microspheres, the average grain size (diameter) of which is 5 µm to 500 µm and preferably 20 µm to 300 µm and especially preferred 50 µm to 150 µm. Such hollow microspheres are tiny hollow spheres made of silicate glass. The wall thickness of the hollow spheres is only a fraction of the total diameter. Therefore, it is suggested that mineral hollow microspheres are used consisting of glass, ceramics or fly ash and particularly include an inert gas. The hollow microspheres are basically responsible for thermal-insulation characteristics of the paste and of the parts produced of the paste.

It is especially preferred to achieve the desired application threshold temperature with the help of a combination of different hollow microspheres, thus with hollow microspheres with different high temperature stabilities, or different melting points with an as low as possible density. By such a combination of different mineral hollow microspheres and fibers the insulation materials produced from the paste can both achieve a high temperature stability to up to about 1200° C. and simultaneously maintain their excellent thermal insulation characteristics that particularly due to the to a largely closed-cell structure of the hollow microspheres is also guaranteed at high temperatures. Simultaneously the closed-cell structure has the effect that the end product cannot adsorb significant amounts of humidity, but remains open to steam.

Polysiloxane is preferably used as inorganic binder and especially preferred an polysiloxane emulsion is used.

According to the invention, a uniform type of fiber or a mixture of different fibers, preferably mineral fibers can be used, particularly glass fibers, glass wool, mineral wool, ceramic fibers, carbon fibers and/or aramid fibers. The use of different mineral fibers is a particular advantage of the paste according to the invention, since thus a significantly elevated stability of the end products even under high temperatures is achieved. Moreover, the green density of the cured end product can be significantly influenced by the type and form of the fibers.

Finally the following composition of the paste according to the invention is proposed:
- hollow microspheres: 10-80% by weight, preferably 30-75% by weight,
- fibers: 3-20% by weight,
- binders: 3-25% by weight (active agent),
- wetting agents: 0.01-1% by weight,
- antifoaming agents: 0.01-2% by weight,
- balance: water.

For the production of the paste according to the invention, hollow microspheres and fibers are mixed with a binder, particularly with a watery polysiloxane emulsion. The surface of the hollow microspheres and the fibers is according to the invention preferably completely wetted with the binder.

In order to improve the wetting, a wetting agent is preferably used. The preferably complete wetting is furthermore advantageously supported by customary antifoaming agents, for example by silicone oil.

As binder preferably an alkyl modified polysiloxane dispersed in water is used. A possible and advantageous binder is also an alkyl silicone resin powder.

Furthermore, the invention relates also to the use of the named paste for fire protection and/or for thermal insulation according to the invention, particularly as a filling composition or sprayable or spreadable material for the sealing of hollow chambers, for the filling of wall areas or for spraying on wall areas and/or in machine construction for the insulation of places that are hard to access or asymmetric and/or for thermal insulation and fire barriers of inlets in fire walls, such as pipe and cable inlets. According to the invention the paste can also be used as a freely shapeable material for the production of shaped parts, particularly by the known core-shooting process, for elevated application threshold temperatures. For these fields of application the paste according to the invention is left to cure after processing and/or shaping at temperatures around room temperature.

Finally, the invention relates also to a shaped part for elevated application threshold temperatures, containing hollow microspheres, fibers and an inorganic binder or a mixture of such binders, characterized in that it contains mineral hollow microspheres and was preferably produced by shaping and curing of a paste containing one of these ingredients and water, particularly a paste.

The invention also relates to such a shaped part that is designed as an insulation layer for elevated application threshold temperatures, particularly in form of a panel for fire doors and fire walls in building construction and ship building, for technical insulation, for the selective insulation of electric switches, power sockets, lamps and suchlike, for fields of application with sudden temperature changes, particularly in foundry technology as inner lining for high-temperature kilns.

It is here particularly preferred that the shaped part have a density of 50 kg/m³ to 500 kg/M³, particularly of 100 kg/M³ to 250 kg/M³.

Preferably the cured shaped part contains more than 80% by weight, particularly about 90% by weight of hollow microspheres.

In a particularly advantageous embodiment the shaped part is designed as a shaped part for metal casting, particularly as a feeder sleeve.

The paste according to the invention can be used as filling, as dried shaped part, as a board and as sprayable material for thermal insulation and for passive fire protection. Here the curing time can be adapted to the drying process by the choice of binder and drying temperature.

In addition to the already mentioned advantages, it is furthermore advantageous that in the paste according to the invention contain no organic solvents and the paste thus can be applied directly on site, with the paste then drying and curing at room temperature. The curing procedure occurs under normal pressure without pressing and is very ecofriendly at temperatures below 130° C. No safety precautions have to be taken with respect to the use of the paste and the fabricated product. At these temperatures no gasses that are harmful to health are released. Finally, the end products are characterized by excellent fire-protection characteristics.

Already during shaping and drying the shaped part obtained can be surface refined with the most different materials. Due to the adhesive capacity of the paste, no additional adhesives have to be used in general.

A further significant advantage of the invention consists in weight reduction compared to common fire-protection boards. The usual densities are of 400 to 500 g/l. Thanks to the invention, densities of about 100 g/l to 250 g/l, typically of about 150 g/l, can be achieved.

The compact compound in the shaped part is maintained at high temperatures. No sintering occurs. The inherent stability is guaranteed even at very high application threshold temperatures of about 1300° C.

EMBODIMENTS OF THE INVENTION

In the following the invention is illustrated by means of several examples.

EXAMPLE 1

Application up to About 800° C.

414 g water is mixed with about 0.5 g wetting agent and about 0.8 g antifoaming agent. By means of a dispersion mixer, 105 g of cut glass wool was stirred into this solution until it was completely wetted. To this mixture 225 g of the binder "Ino Bond W+" (trade name of the company Inomat), an alkyl modified polysiloxane dispersion, was added under vigorous stirring. Under further vigorous stirring 75 g of hollow microspheres "Q-CEL 6014" (trade name of the company Osthoff-Petrasch) were added that are temperature resistant up to a temperature of about 800° C. This mixture was transferred into a paste mixer and further 180 g of the hollow microspheres were mixed in at a low speed. The paste has a solids content of about 48% and a density of about 400 kg/M³. After the drying the density was of about 190 kg/M³.

Exemplary Fields of Application

In machine construction for insulation of places that are hard to access or asymmetric, production of shaped parts for application threshold temperatures up to 800° C., thermally insulating and fire barriers for pipe or cable inlets in fire-protection walls.

EXAMPLE 2

Application up to 1000° C.

393 g water was mixed with 0.4 g wetting agent and 0.8 g antifoaming agent. By means of a dispersion mixer 21 g glass wool and 48 g mineral wool were mixed into this solution until it was completely wetted. 242 g of the binder "Ino Bond W+" was added to this mixture under vigorous stirring. Under further vigorous stirring 110 g of the hollow microspheres "K1" (trade name of the company Inomat). This mixture was transferred into a paste mixer and 185 g of the hollow microspheres "Filite SG" (trade name of the company Omya) that are temperature resistant up to about 1200° C. were mixed in at low speed.

The finished paste has a solids content of about 50% and a theoretical density of about 575 kg/M³. After drying the density is of about 200 kg/M³.

In experiments on a small test bed (Kleinprüfstand) according to DIN 4102 part 8, it was proven that even after a test duration of 90 min a constant difference in temperature (1000° C. compared to 250° C.) was observed at the 2 cm thick insulation boards.

From this results that e.g. fire walls or doors as described in DIN 4102 part 4 or DIN 18082 cannot be defined any longer over the thickness of the lining but can be defined over the type and thickness of the insulation board. Thus, lighter and thinner constructions are possible or asymmetric places with temperature loads up to max. 1000° C., Exemplary fields of application are as follows: in machine construction for insulation of places that are hard to access or asymmetric at temperature loads up to max. 1000° C., in production of shaped parts for application threshold temperatures up to max. 1000° C., and in insulation and fire barriers of pipe or cable inlets in fire walls, fire doors and fire walls, e.g. for building construction and ship building.

EXAMPLE 3

Application up to 1200° C.

500 g water was mixed with 0.5 g wetting agent and 1.0 g antifoaming agent and by means of a dispersion mixer 150 g of the alkyl silicone resin powder "Silres MK Pulver" (trade name of the company Wacker) were stirred in. Subsequently 80 g mineral wool was stirred into this dispersion until it was completely wetted. Under further vigorous stirring 75 g of the hollow microspheres "MCB-2" (trade name of the company Osthoff-Petrasch) that are temperature resistant to up to 900° C. and 100 g of the hollow microspheres "Fillite SG" were mixed in. This mixture was transferred into a paste mixer and 130 g of the hollow microspheres "Fillite SG" was mixed in at a very low speed.

The finished paste had a solids content of about 46% and a theoretical density of about 600 kg/m³. The density after drying was about 300 kg/m³.

Exemplary Fields of Application

In machine construction for insulation of places that are hard to access or asymmetric at temperature loads up to 1200° C., production of shaped parts for application threshold temperatures up to max. 1200° C., insulation and fire barriers regarding pipe or cable inlets in fire walls, fire doors and fire walls, e.g. for building construction and ship building, inner linings of high temperature kilns, fire-protection panels for railway cars, resistant to up to 1200° C. approximately.

Surprisingly, curing under normal conditions, that is at room temperature and under normal pressure requires only one day approximately, as shown by the following application example according to the invention for a fire-protection at the underfloor of a rail vehicle.

EXAMPLE 4

Application up to 1300° C. to 1400° C.

100 g water was mixed with 0.1 g wetting agent and 0.2 g antifoaming agent and by means of a dispersion mixer 119 g of "Vatramil KG 75" (alkyl modified polysiloxane/potassium methyl siliconate, trade name of the company MV Engineering) was stirred in. Subsequently, 39 g basalt fibers was stirred into this dispersion until it was completely wetted. Under further vigorous stirring 77 g of the hollow microspheres "MCB-2" (trade name of the company Osthoff-Petrasch) that are temperature resistant to up to 900° C. were added. This mixture was transferred into a paste mixer and 674 g of the hollow microspheres "Fillite SG" was mixed in at low speed.

The finished paste had a solids content of about 84% and a theoretical density of about 650 kg/m³. The density after drying was of about 350 kg/M³.

Exemplary Fields of Application

Foundry Technology

EXAMPLE 5

Nowadays, rail vehicles are made of aluminum. Aluminum has a softening point of about 550° C. In order to ensure the roadworthiness of a train in case of a fire, the aluminum has to be protected from the outside against high temperatures in the area of load-bearing elements. Thus, the material has to meet the following requirements: nonflammability, low weight, good insulation effect at high temperatures and small thickness. Furthermore, the material has to be hydrophobic and not hygroscopic and easily processable. These requirements are already fulfilled by the material according to the invention if it has a thickness of 1.5 cm.

The material was applied overhead to the floor by means of a mortar sprayer. Already after 16 hours (overnight), the drying had progressed so far that other vehicles could be further processed. The weight of this passive protection according to the invention was a decrease of about 50% compared to the common solution, the work effort to about 30%.

According to the invention the feeders/feeder sleeves mentioned above can be produced with the paste according to the invention, namely by core-shooting. This way, the paste is explosively "shot" in a two-piece form by means of compressed air at a pressure of 3 to 6 bar. The paste according to the invention is very well suited for this kind of shaping procedure. The thus produced shaped part is sufficiently stable to dry and thus to cure in air or at an elevated temperature. It is particularly advantageous here if hollow microspheres with different melting ranges are used. When the shaped part is heated, hollow microchambers are formed in the shaped part that allow an extension of the still-solid material so that crack formation due to thermal extension is avoided.

EXAMPLE 6

The feeder made of the paste according to the invention had a density of about 0.1 to 0.4 g/cm³ and only a very small organic component. For curing the moist shaped part produced by core-shooting was dried at 200° C. for 2 hours, although a curing at temperatures below 100° C. is also possible if catalyzers are used. The stability criteria of the fire-protection regulations were fulfilled. The feeders were odorless and fumeless in the practical test after the casting procedure. The shaped part also was not hygroscopic. It had a very good thermal-insulation characteristic corresponding to the characteristic of the best of the so far known feeders. A stability test at 740° C. with an $AlSi_{12}$ alloy showed no thermal load, but only a slight coloration on the surface of the before light gray material.

In order to control of the fire-protective effect of board-shaped shaped parts made of a paste according to the invention, these boards had to lie for one hour on a 1400° C. hot surface. Even though the material sintered on the hot surface it maintained its insulating effect.

A fundamental component of the invention is the high percentage of mineral hollow microspheres in combination with an inorganic binder and with fibers in a freely shapeable paste and in the shaped part made of the paste. Thanks to the combination of these components, a plurality of advantages is achieved in a cost-efficient way, such as free shapeability, simple producibility of the solid body out of the paste, stability at high temperatures without crack formation, inherent stability of the paste as well, low green density and other advantages.

The paste consists to at least 50% by weight and the shaped part produced thereof consists to at least 80% to 90% by weight of the hollow microspheres that thus are the major component both of the paste and of the shaped part. The shaped part therefore almost exclusively consists of hollow microspheres. In the state of the art, however, only a small weight portion of the hollow microspheres is added to already existing formulations.

The paste and the shaped part according to the invention can be used in the fields:

building construction, tunnel construction, ship building, vehicle construction, rail vehicle construction, foundry, industry, technology and are applied as fire barriers for cables/pipes, pipe jackets for heating installations, flue gas pipes, etc; joint seals, fillings of holes and cracks in walls and ceilings, fire-protection channels, fire-protection coatings, fire shutters, fire walls, feeder for foundry technologies, coatings for exhaust installations, for electrical equipments, for heating devices, for engines, for ovens, for grilling devices; insulation/maintenance of chimneys, insulation of power sockets, ceiling lamps, switches, fuse boxes; insulation of industrial ovens, combustion plants; insulation of domestic appliances (microwave, ceramic stove open, oven); floor coverings, wall and ceiling coverings/linings, insulation of floors of rail vehicles or in general; shaped part boards for fire shutters, doors, bulkheads; sprayed rendering at ferro-concrete constructions; board coverings, sprayed rendering linings and many more.

The invention claimed is:

1. A paste, curable by drying at room temperature under normal pressure, and stable for elevated activation temperatures of up to 1400° C., which consists of:
   a mixture of hollow microspheres: with differing melting points 30-75% by weight,
   fibers: 3 to 10% by weight,
   an inorganic binder or mixture of said binders: 3-25% by weight, as active agents, and
   wetting agents: 0.01-1% by weight,
   anti-foaming agents: 0.01-2% by weight,
   balance water,
wherein the paste is freely shapeable.

2. The paste, curable by drying at room temperature under normal pressure, according to claim 1, wherein the hollow microspheres have an average grain size of 5 μm to 500 μm in diameter.

3. The paste, curable by drying at room temperature under normal pressure, according to claim 1, wherein the hollow microspheres are made of glass, ceramics or fly ash and further include an inert gas.

4. The paste, curable by drying at room temperature under normal pressure, according to claim 1, which contains a mixture of hollow microspheres with different high melting points.

5. The paste, curable by drying at room temperature under normal pressure, according to claim 1, wherein a polysiloxane is used as binder.

6. The paste, curable by drying at room temperature under normal pressure, according to claim 1, wherein a uniform type of fibers or a mixture of different fibers is used.

7. A method of protecting a hollow chamber or a wall against fire or thermally insulating a hollow chamber or a wall, which comprises the step of: applying as a filling composition as a sprayable or spreadable material for sealing of hollow chambers, for filling of wall areas or for spraying on wall areas and/or in machine construction for insulation of places that are hard to access or asymmetric and/or for thermal insulation and fire barriers of inlets in fire walls, including pipe and cable inlets, an effective amount of the paste, curable by drying at room temperature under normal pressure, defined in claim 1.

8. A method of producing a shaped part for elevated application threshold temperatures, by free forming by pressing and by curing an effective amount of the paste, curable by drying at room temperature under normal pressure, defined in claim 1.

9. A shaped part stable for elevated application threshold temperatures of up to 1400° C. which comprises a shaped, cured paste, cured by drying at room temperature under normal pressure, a paste which consists of:
   a mixture of hollow microspheres: with differing melting points 30-75% by weight,
   fibers: 3 to 10% by weight,
   an inorganic binder or mixture of said binders: 3-25% by weight, as active agents, and
   wetting agents: 0.01-1% by weight,
   anti-foaming agents: 0.01-2% by weight,
   balance water, wherein the paste is freely shapeable.

10. The shaped part according to claim 9, formed as an insulating layer for elevated application threshold temperatures, in a form of boards for fire doors and fire walls in building construction and ship building, for technical insulation, for the selective insulation of electric switches, power sockets, or lamps, or for foundry technology as an inner lining for high-temperature kilns.

11. The shaped part according to claim 9, wherein its density is of 50 kg/m$^3$ to 500 kg/m$^3$.

12. The shaped part according to claim 9, wherein the cured shaped part contains more than 80% by weight.

13. The shaped part according to claim 9, designed as a shaped part for metal casting.

* * * * *